United States Patent Office 2,832,799
Patented Apr. 29, 1958

2,832,799

AMIDES OF POLYUNSATURATED LONG CHAIN DIBASIC ACIDS AND RESINOUS PRODUCTS PREPARED THEREFROM

George B. Payne, Curtis W. Smith, and Albert C. Mueller, Berkeley, Calif., assignors to Shell Development Company, New York, N. Y., a corporation of Delaware No Drawing. Application February 3, 1955
Serial No. 486,033

11 Claims. (Cl. 260—482)

This invention relates to a new class of organic amides and to resinous products prepared therefrom. More particularly, the invention relates to new amides of unsaturated long chain dibasic acids, to a method for their preparation, and to the utilization of the new amides, particularly in the preparation of resinous products which are especially useful in surface coating applications.

Specifically, the invention provides new and particularly useful amides, and particularly N-substituted amides, of alpha,omega dicarboxylic acids having an open chain of at least 16 aliphatic carbon atoms and containing at least two ethylenic groups which are non-conjugated and at least three carbon atoms removed from the terminal carboxyl groups, and preferably polycarboxylic acids having the special formula described hereinafter. The invention further provides valuable resinous materials prepared from these amides and coating compositions containing these resinous materials.

Resinous materials containing a plurality of amide groups, such as the polyamides obtained from polyamines and acids, such as adipic acid, have never been very useful heretofore in the surface coating field. In general, films prepared from the polyamides lack the desired degree of durability and flexibility and have poor resistance to alkali, acids and solvents. In addition, many of the polyamides fail to have the heat resistance required for most surface coatings.

It is an object of the invention to provide a new class of amides and a method for their preparation. It is an object of the invention to provide a new class of amides which may be used to prepare resinous materials which are suited for use in preparing coating and impregnating compositions. It is a further object to provide a new class of amides which may be used to prepare resinous products which form coatings having excellent durability and flexibility. It is a further object to provide new amides which may be used to prepare resinous products which form coatings having resistance to water, acids and solvents. It is a further object to provide amides which may be used to prepare coating compositions having improved heat resistance. It is a further object to provide new amides which may be used to prepare coating and impregnating compositions having pesticidal properties. It is a further object to provide a new class of amides which are particularly useful as plasticizing and flexibilizing materials for other film-forming materials. These and other objects of the invention will be apparent from the following detailed description thereof.

It has now been discovered that these and other objects may be accomplished by the novel amides of the present invention comprising amides, and particularly the N-substituted amides, of alpha,omega dicarboxylic acids having an open chain of at least 16 aliphatic carbon atoms and containing at least two ethylenic groups which are non-conjugated and at least three carbon atoms removed from the terminal carboxyl groups, and preferably polycarboxylic acids of the formula

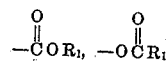

(A)

wherein A represents a divalent radical having a chain of 3 to 9 carbon atoms, and R is a member of the group consisting of hydrogen, halogen, nitro, cyano, $$-\overset{O}{\underset{}{C}}OR_1, \ -O\overset{O}{\underset{}{C}}R_1$$

$-OR_1$, $-SR_1$, $-SO_2R_1$ and $-R_1$ radicals wherein $R_1$ is a hydrocarbon radical containing no more than 8 carbon atoms, at least 8 of the 12 R's being hydrogen. It has been found that these amides have, due to their special structural features, many new and valuable properties which make them of great value in the chemical and related industries. These new amides may, for example, be converted as indicated hereinafter, to resinous products which are particularly suited for the preparation of coating and impregnating compositions. Coatings prepared from the resinous products are hard and durable and have excellent flexibility and resistance to water, alkali and acid and conventional solvents such as ketones and alcohols. In addition, the coatings have improved heat resistance and can be exposed to high temperatures for long periods of time without undergoing decomposition. Furthermore, the compositions prepared from these resinous materials display some pesticidal properties and may be of value as impregnates for wood, tents and the like.

It has also been found that the new amides of the invention may be added to coatings containing film-forming materials, such as the vinyl polymers and cellulose ethers and esters, and in combination therewith act to give the compositions improved flexibility, particularly at the lower temperatures, as well as improved durability and some pesticidal properties.

The acids, amides of which are provided by the present invention, include the polyethylenically unsaturated polycarboxylic acids having a chain of at least 16 carbon atoms and having two of the ethylenic groups at least three carbon atoms removed from the carboxyl groups. A particularly preferred group of these acids include those having the hereinabove described Formula A. Examples of these acids include, among others, 8,12-eicosadiene-1,20-dioic acid, 3,16-dimethyl-8,12-eicosadiene-1,20-dioic acid, 8,12-dimethyl, 8,13-dimethyl, and 9,12-dimethyl-8,12-eicosadiene-1,20-dioic acid, 8,12-diisopropyl-8,12-eicosadiene-1,20-dioic acid, dichloro-7,11-octadecadiene-1,18-dioic acid, 3,16-dimethoxy-7,11-octadecadiene-1,18-dioic acid, 3,16-dinitro-7,11-octadecadiene-1,18-dioic acid, 4,15-dicyano-7,11-octadecadiene-1,18-dioic acid, 9,13-docosadiene-1,22-dioic acid, 3,17-dibutyl-8,13-docosadiene-1,22-dioic acid, 3,17-dichloro-8,13-docosadiene-1,22-dioic acid, 3,16 - dibutylsulfonyl - 8,12 - eicosadiene - 1,20-dioic acids, 10,14-tetracosadiene-1,24-dioic acid, 3,3,4,4-tetramethyl-8,12-eicosadiene-1,20-dioic acid, 3,4,16,17-tetrabutyl-8,12-eicosadiene-1,20-dioic acid, 4,15-dimethyl-8-vinyl-10-octadecene-1,18-dioic acid, 4,15-dibutyl-8-vinyl-10-octadecene-1,18-dioic acid, dimethyl 7-vinyl-9-hexadecene-1,16-dioic acid, dimethyl-8-isopropenyl-10-octadecene-1,18-dioic acid, 8,16-diacetyl-8,12-eicosadiene-1,20-dioic acid, 8,16-diacetoxy-8,12-eicosadiene-1,20-dioic acid, carboethoxy-8,12-eicosadiene-1,20-dioic acid, 3,16-dicarbobutoxy-8,12-eicosadiene-1,20-dioic acid, 3,16-dicarboxy-8,12-eicosadiene-1,20-dioic acid, 3,16-diethylmercapto-7,11-octadecadiene-1,18-dioic acid and the like.

Especially preferred acids to be used in preparing the amides of the present invention include those of the formula

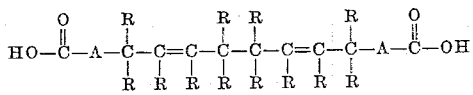

wherein A is a divalent hydrocarbon radical containing a chain of from 3 to 5 carbon atoms between the two valence bonds and having a total of no more than 12 carbon atoms, and R is a member of the group consisting of hydrogen, lower alkyls and chlorine, but preferably no more than 5 R's being chlorine. Still more preferred are the acids of the formula

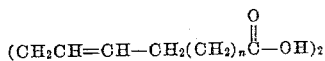

wherein $n$ is a whole number from 3 to 5. Examples of these preferred acids include, among others, 8,12-eicosadiene-1,20-dioic acid, 3,16-dimethyl-8,12-eicosadiene-1,20-dioic acid, 8,12-dimethyl-8,13-eicosadiene-1,2-dioic acid, 7,11-octadecadiene-1,18-dioic acid and 3,16-dibutyl-7,11-octadecadiene-1,18-dioic acid.

The above-described preferred acids to be used in preparing the amides are obtained by treating a cyclic peroxide of special structure with compounds having a conjugated system of double bonds, such as butadiene and cyclopentadiene, in the presence of a heavy metal capable of existing in several valence forms, such as iron or cobalt. This method of preparation may be exemplified by the following equations showing the preparation of 8,12-eicosadienedioic acid from 1,1'-dihydroxydicyclohexyl peroxide (obtained from cyclohexanone and hydrogen peroxide) and butadiene in the presence of ferrous sulfate:

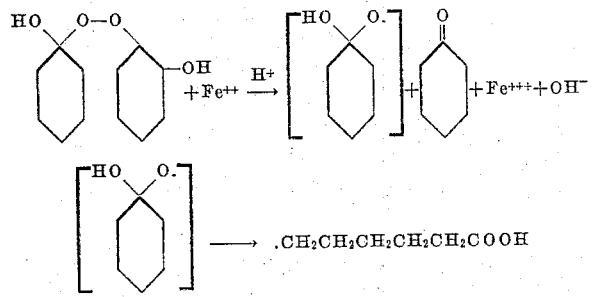

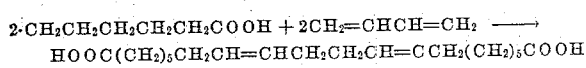

$$2 \cdot CH_2CH_2CH_2CH_2CH_2COOH + 2CH_2=CHCH=CH_2 \longrightarrow$$
$$HOOC(CH_2)_5CH_2CH=CHCH_2CH_2CH=CCH_2(CH_2)_5COOH$$

The acid produced by the above process also contains minor quantities of other acids, such as $$HOOC(CH_2)_5CH_2CH(CH=CH_2)CH_2CH=CHCH_2(CH_2)_5COOH$$

Particularly advantageous cyclic peroxides to be used in the process are those represented by the formula

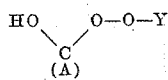

wherein Y is a hydrogen atom, a

radical, or a

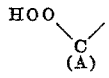

radical, and A is a divalent radical containing a chain of no more than 5 carbon atoms between the two free bonds of the radical, and preferably divalent hydrocarbon radicals which may be substituted, if desired, with functional groups, such as hydroxy, nitro, cyano, carboxy, ester, ether and sulfone groups and halogen atoms.

Cyclic peroxide compounds to be used in the above process are preferably obtained by reacting hydrogen peroxide with a cyclic ketone of the formula

wherein A is a divalent radical as described above. These peroxides can be produced as described in Milas—U. S. 2,298,405, the products from equimolar amounts of cyclic ketone and hydrogen peroxide being chiefly the 1-hydroxy-1'-hydroperoxydicycloalkanyl peroxides

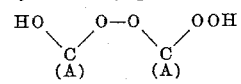

Preferred cyclic peroxides for use in the present process are the 1,1'-dihydroxydicycloalkanyl peroxides

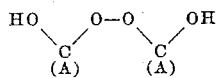

obtainable by the use of two moles of cyclic ketone per mole of hydrogen peroxide.

The A in the above-described formula of the cyclic ketone is preferably unsubstituted methylene groups or methylene groups substituted with methyl, ethyl, propyl, butyl, benzyl, phenyl, cyclohexyl, chloro, bromo, hydroxy, methoxy, keto substituents, and the like. A may also form a part of a phenyl or cyclohexyl ring. Representative examples of such suitable divalent radicals include:

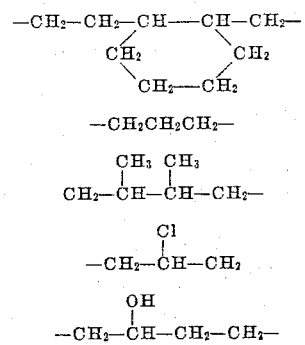

and the like.

Conjugated diethylenic compounds which can be reacted with the above-described cyclic peroxide compounds to produce the polyethylenic carboxylic acids include, among others, the conjugated diolefins, such as those of 4 to 18 carbon atoms as 1,3-butadiene, 1,3-pentadiene, isoprene, dimethyl-1,3-butadiene, 1,3,5-hexatriene 2-ethyl-1,3-pentadiene, 2,4-octadiene, 1,1-dimethyl-3-tertiary butyl-1,3-butadiene, 2-phenyl-1,3-butadiene, 1,4-diphenyl-1,3-butadiene, 2-benzyl-1,3-butadiene, 2-cyclohexyl-1,3-butadiene, 1,1-diphenyl-3,5-hexadiene, cyclopentadiene, 1,3-cyclohexadiene, 1-methyl-2,4-cyclopentadiene, 2-methyl-1,3-cyclopentadiene, the mono- and di-methyl-1,3-cyclohexadienes, 1-vinyl-1-cyclohexene, 1-tertiary butyl-1,3-cyclohexadiene, and 1,3-cycloheptadiene are typical, and substitution products of such conjugated diolefins.

Preferred compounds having the conjugated system of double bonds to be used in the process are those of the formulae

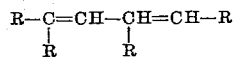

and

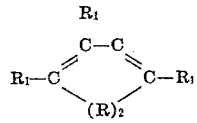

R and $R_1$ are members of the group consisting of hydrogen or hydrocarbon radicals, and preferably aliphatic hydrocarbon radicals containing from 1 to 8 carbon atoms and $R_2$ is a divalent alkylene group containing from 1 to 3 carbon atoms or a substituent derivative thereof which has one or more of the hydrogen atoms replaced by hydrocarbon radicals.

The proportions in which the cyclic peroxide and the compound possessing the conjugated system of double bonds are employed in the reaction may vary over a considerable range. In most cases, the peroxide and the compound possessing the conjugated system of double bonds will be employed in approximately equal molecular amounts, but larger or smaller amounts may be used as desired. Preferably, one mole of the peroxide will be reacted with from 1 to 2 moles of the compound possessing the conjugated system of double bonds.

The heavy metals, such as iron and cobalt, are employed in the reaction in at least equivalent amounts. The expression "equivalent amount" in this regard refers to that amount required for the formation of free radicals from one molecule of peroxide. The heavy metals are preferably employed in amounts varying from 1 to 1.5 equivalents.

In place of the equivalent or excess amounts of the heavy metals, however, one can use smaller amounts of the metals together with a reducing agent which serves to convert the metal ions back to the lower valence form, e. g., ferric ions to ferrous ions, as fast as they are formed. Examples of such reducing agents includes l-ascorbic acid, sodium formaldehyde sulfoxylate, sodium bisulfite, reducing sugars and the like.

The reaction between the peroxide and the compound possessing the conjugated system of double bonds may be effected in water, solvents or emulsions. The reaction is preferably carried out in the presence of common solvents, such as methanol, ethanol, tertiary butanol, benzene, diethyl ether, methyl acetate, acetone, dioxane, and the like, or mixtures thereof or mixtures of these solvents with water.

Temperatures employed in the reaction between the peroxide and the compound possessing the conjugated system of double bonds may vary over a considerable range, but is generally maintained between about $-15°$ C. to about $60°$ C. The temperature is preferably maintained between about $-10°$ C. and $25°$ C. Pressures used may be atmospheric, superatmospheric or subatmospheric. While atmospheric pressure is generally preferred, it may be desirable to operate at higher pressures, such as, for example, when it is desired to maintain relatively volatile solvents in the liquid phase.

The preparation of eicosadienedioic acid is illustrated below.

EICOSADIENEDIOIC ACID

About 50 parts of a 34% hydrogen peroxide solution was added portionwise to 98 parts of cyclohexanone. The temperature was held below $40°$ C. by intermittent cooling. After completion of the addition, the mixture was allowed to stand at room temperature for an hour.

The 1,1'-dihydroxydicyclohexyl peroxide produced above was then dissolved in 750 parts of methanol containing 25 parts of concentrated sulfuric acid. The solution was cooled to $0°$ C. and 81 parts (1.5 moles) of butadiene dissolved therein. A solution of 147 parts (0.53 mole) of ferrous sulfate heptahydrate and 25 parts of concentrated sulfuric acid in 250 parts of water was added with stirring to the peroxide solution at $0°$ C. over a period of 1½ to 2 hours. After completion of the addition, the mixture was warmed to $65°$ C. and the excess butadiene removed. The mixture was then cooled, diluted with two liters of water and extracted with a 300 part portion of benzene. The benzene solution was dried over anhydrous sodium sulfate and distilled. The benzene and cyclohexanone were removed and then the bottoms boiled with a solution of sodium hydroxide for about three hours. Acidification of the alkaline solution liberated an oily solid which was taken up in benzene. The benzene solution was washed with water, dried and concentrated to a semisolid residue. Analysis of the residue gave the following values:

|  | Found | Calcd. for $C_{22}H_{38}O_4$ |
|---|---|---|
| Carbon | 70.4 | 70.9 |
| Hydrogen | 10.1 | 10.1 |
| Acidity | 0.59 eq./100 g. | 0.59 eq./100 g. |
| Iodine No | 139 eq./100 g. | 150 eq./100 g. |
| OH value | 0.006 eq./100 g. | 0. |

Recrystallization of the crude acid gave a straight chain isomer having a melting point of $110°$ C. to $112°$ C.

The acid halides of the above-described acids as well as their lower alkyl esters, such as their methyl, ethyl and isopropyl esters, may also be used in producing the novel amides of the invention as indicated hereinafter.

The nitrogen-containing materials used in the preparation of the novel amides of the invention will vary depending upon the type of amide desired. The unsubstituted amides may be obtained by reacting the above-described acids or derivatives with ammonia or ammonia derivatives such as ammonium hydroxide, ammonium chloride and the like. The N-substituted amides may be obtained by reacting the above-described acids or derivatives with an amine, carbamate or thiocarbamate. These amines, carbamates and thiocarbamates may be aliphatic, cycloaliphatic, aromatic or heterocyclic and may be saturated or unsaturated. Examples of the amines include, among others, allylamine, isopropylamine, butylamine, cyclohexylamine, dodecylamine, nonylamine, octadecylamine, diallylamine, benzylamine, 3-cyclohexenylamine, methallylamine, 2-butenylamine, ethylcyclohexylamine, 2,5,5-trimethylhexylamine, ethylene diamine, diethylamine, 1,5-hexanediamine, aniline, 2,3-xylidine, mesidine, o-phenylenediamine, p-phenylenediamine, 1,6-octanediamine, 3'-biphenyldiamine, 1,4-naphthalinediamine, 1,2,3-benzenetriamine, o-toluidine, diethylene triamine, tripropylene tetramine, 2-furanamine, 2-p-dioxanamine, 3-pyranylamine, triethylene tetramine and heptaethylene octamine.

Examples of the carbamates and thiocarbamates include, among others, allyl carbamate, allyl thiocarbamate, allyl dithiocarbamate, isopropyl carbamate, N-propyl allyl carbamate, N-cyclohexyl carbamate, N-cyclohexenyl allyl carbamate, N-phenyl allyl carbamate, N-cyclohexyl amyl carbamate, N-methallyl carbamate, N-dodecyl carbamate, N-octyl thiocarbamate, N-hexyl dithiocarbamate, and N-phenyl dithiocarbamate.

Examples of the novel amides of the present invention include, among others, 8,12 - eicosadiene - 1,2 - diamide, 3,16 - dimethyl - 8,12 - eicosadiene - 1,20 - diamide, 8,12-diisopropyl - 8,12 - eicosadiene - 1,20 - diamide, 4,15-dicyano - 7,11 - octadecadiene - 1,18 - diamide, 3,16 - dichloro - 8,12 - eicosadiene - 1,2 - diamide, 3,3,4,4 - tetramethyl - 8,12 - eicosadiene - 1,20 - diamide, 8,16 - diacetoxy - 8,12 - eicosadiene - 1,20 - diamide, carboethoxy-8,12 - eicosadiene - 1,20 - diamide, N,N' - diallyl 8,12-eicosadiene - 1,20 - diamide, N,N' - diisopropyl 8,12-eicosadiene - 1,20 - diamide, N,N' - dibutyl 8,12 - eicosadiene - 1,20 - diamide, N,N' - dicyclohexyl 3,16 - dimethyl-8,12 - eicosadiene - 1,20 - diamide, N,N' - diphenyl 8,12-diisopropyl - 8,12 - eicosadiene - 1,20 - diamide, N - butyl-N - carballyloxy 8,12 - eicosadiene - 1,20 - diamide, N-allyl N - carballyloxy 3,16 - dimethyl - 8,12 - eicosadiene-1,20 - diamide, N,N' - dithiocarballyloxy 8,12 - eicosadiene - 1,2 - diamide, N,N' - dicarballyloxy 4,15 - dicyano-7,11 - octadecadiene - 1,18 - diamide, N,N' - diallyl 8,16-diacetoxy - 8,12 - eicosadiene - 1,20 - diamide, N,N' - dibenzyl 4,15 - dichloro - 7,11 - octadecadiene - 1,18 - diamide, N - allyl N - methallyl 3,3,4,4 - tetramethyl - 8,12-eicosadiene - 1,20 - diamide, N,N' - dinonyl 8,12 - eicosadiene - 1,20 - diamide, N,N' - dicarbethoxy 8,16 - diacetoxy - 8,12 - eicosadiene - 1,20 - diamide, N,N' - dithiocarballyloxy 4,15 - carbethoxy - 8,12 - eicosadiene - 1,20- diamide, N,N' - dithiocarbethoxy 4,15 - dicyano - 7,11-octadecadiene - 1,18 - diamide, N,N' - diisopropyl 4,15-dimethyl - 8 - vinyl - 10 - octadecene - 1,18 - diamide, N,N' - diallyl 10,14 - tetracosadiene - 1,24 - diamide, N,N' - (4 - aminobutyl) 8,12 - eicosadiene - 1,20 - diamide, N,N' - di(5 - aminohexyl) 8,12 - eicosadiene - 1,20 - diamide, N,N' - di(8 - aminooctyl) 3,3,4,4 - tetramethyl-8,12 - eicosadiene - 1,18 - diamide, N,N,N',N' - tetraethyl 8,12 - eicosadiene - 1,20 - diamide, N,N' - di(2 - ethylphenyl) 8,12 - eicosadiene - 1,20 - diamide, N,N' - di (furfuryl) 7,11 - octadecadiene - 1,18 - diamide, N,N'-di(4 - aminophenyl) 7,11 - octadecadiene - 1,18 - diamide, N,N' - di(4 - aminonaphthyl) 7,11 - octadecadiene - 1,18-diamide, N,N' - dioctadecyl 8,12 - eicosadiene - 1,20-diamide.

Preferred amines to be used in preparing the novel amides include the monoamines of the formula

and polyamines of the formulae

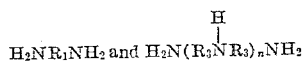

wherein R is a monovalent hydrocarbon radical, preferably containing no more than 18 carbon atoms, $R_1$ and $R_3$ are bivalent hydrocarbon radicals, preferably containing no more than 10 carbon atoms and $n$ is an integer, preferably from 1 to 8.

Preferred carbamates and thiocarbamates include those of the formula

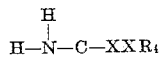

wherein X is oxygen or sulfur and $R_4$ is a hydrocarbon radical, preferably containing no more than 12 carbon atoms.

Coming under special consideration, particularly because of their ability to form valuable resinous materials through the addition polymerization, are the amines and carbamates and thiocarbamates possessing polymerizable ethylenic linkages, such as, for example, allyl amine, methallyl amine, 2-butenylamine, 1,4-hexen -1- diamine, 2,4-hexadienylamine, ethallyl amine, allyl carbamate, allyl thiocarbamate, ethallyl dithiocarbamate, 2-butenyl carbamate and 8-octenylcarbamate and 9-dodecenylcarbamate. Of particular interest are the alkenyl and cycloalkenylamines containing up to 8 carbon atoms and the alkenyl and cycloalkenyl carbamates and thiocarbamates wherein the alkenyl and cycloalkenyl radicals contain up to 8 carbon atoms.

Also of special value, particularly because of their exceptionally fine ability to form valuable resinous materials through reaction with polyepoxides, are those having at least one active hydrogen attached to nitrogen after formation of the amide, and particularly the polyamines of the formula

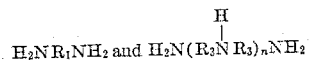

wherein $R_1$ and $R_3$ are bivalent hydrocarbon radicals, and preferably alkylene radicals, containing no more than 10 carbon atoms, and $n$ is an integer, preferably from 1 to 8, such as 1,4-butanediamine, 1,5-pentanediamine, 1,6-hexanedamine, 1,8-octanediamine and 1,10-decanediamine, 4-octene-1,8-diamine, 1,6-cyclohexanediamine, phenylenediamine, diethylene triamine, tetraethylene pentamine, ethylene diamine, and heptaethylene octamine. N, N'-di(8-amino-3,6-diazaoctyl) 7,11-octadecadiene - 1,18-diamide, N,N'-di(12 - amino-3,6,9-triazadodecyl) 8,12-eicosadiene-1,20-diamide, and N,N'-di(8-amino - 3,6,8,10 - tetraazaoctadecyl) 7-vinyl-9-hexadecene-1,16-diamide.

Examples of the preferred amides prepared from the monamines of the formula H N R and polyamines of the formulae $H_2NR_1NH_2$, $NH_2(R_3NR_3)NH_2$ wherein $R_1$ and $R_3$ are bivalent hydrocarbon radicals, and carbamates of the formula $HNCXXR_4$ wherein X is oxygen or sulfur and $R_4$ is a hydrocarbon radical, and the above-described preferred acids of Formula A above, include, among others, such as, for example, 8, 12 - eicosadiene-1,20-diamide, 8,12 - diisopropyl - 8,12-eicosadiene-1,20-diamide, 3,16-dichloro-8,12-eicosadiene-1,2 - diamide, N-butyl-N-octyl 8,12-eicosadiene-1,20-diamide, N,N' - diallyl 3,16-dichloro-8,12-eicosadiene - 1,20-diamide, N, N' - di(5-aminohexyl) 7,11-octadecadiene - 1,18 - diamide, N,N'-dicyclohexyl 4, 15 - dimethyl - 7,11 - octadecadiene-1,18-diamide, N,N' - dithiocarballyloxy 8,12 - eicosadiene-1,20-diamide, N,N'-dicarboethoxy 8,12-eicosadiene-1,20-diamide, and N,N' - di(8-amino - 3,6 - diazaoctyl) 7,11-octadecadiene-1,18-diamide.

The particularly preferred amides possessing the ethylenically unsaturated linkages which may be used to prepare the valuable resinous products may be exemplified by the following; N,N'-diallyl 8,12 - eicosadienediamide-1,20-diamide, N,N'-dicarbomethoxy 8,12-eicosadiene-1,20-decadiene-1,18 - diamine, N,N' - dithiocarballyloxy 7,11-octadecadiene-1,18 - diamide, N,N' - diallyl 10,14 - tetracosadiene - 1,24 - diamide, N,N' - dicarbethallyloxy dimethyl-7-vinyl-9-hexadecene-1,16-diamide, and N,N'-dicyclohexenyl 8,12-eicosadiene-1,20-diamide.

The particularly preferred amides possessing the active hydrogen which may be used to prepare valuable resinous products with polyepoxides or polyisocyanates may be exemplified by the following: 8,12- eicosadiene-1,2-diamide, 3,16 - dietmethyl - 8,12 - eicosadiene - 1,20-diamide, N,N'-(4-aminobutyl) 8,12 - eicosadiene-1,20-diamide, N,N' - (5-aminooctyl) 7,11-octadecadiene-1,18-diamide, N,N'-di(8 - amino - 3,6- diazaoctyl) 7,11-octadecadiene - 1,18 - diamide, N, N' - di(8 - amino-3,6,8,10-tetrazooctadecyl) 7,11-9-hexadecene-1,16-diamide.

The amides of the present invention may be prepared by a variety of methods. The unsubstituted amides may be prepared, for example, by reacting the acid or acid chloride with ammonia or ammonia derivative, and the N-substituted derivatives may be prepared by reacting the acid with the desired amine preferably in the presence of a catalyst, such as phosphorous pentaoxide, thionyl chloride and phosgene or the acids may be reacted with the amine to form the salt and then heating the salt to split out water to yield the amide. The compounds prepared from the amines may also be produced by reacting the amine with an acid chloride of the polycarboxylic acid in the presence of pyridine or other alkaline reacting material as quinoline, dimethylaniline or inorganic bases. The compounds prepared from the amines may also be produced by reacting the amine with a lower alkyl ester of the polycarboxylic acid and then removing the formed alkanol from the reaction as it progresses. The compounds prepared from the carbamates may also be produced by reacting an amide of the polycarboxylic acid prepared as shown above with the desired ester of chloroformic acid, chlorothion-formic acid, or chloro-dithio-formic acid, in the presence of the aforedescribed alkaline reacting compounds.

The proportions of reactants employed in the above-described preparation processes may vary over a wide range. It is preferred to employ the reactants in approximately stoichiometric quantities. Thus, in reacting the dibasic acids, chloride or esters with the ammonia or monoamines, one should preferably react one mole of the acid or acid derivative with approximately two moles of the ammonia or monoamines. A slight excess of either reactant may be employed, but it is generally preferred to use the ammonia or monoamine in excess as they are more easily removed from the reaction mixture.

In the preparation of the amides from the polyamines, it is preferred to react one mole of the acid or acid derivatives with at least two moles of the polyamine so as to form the amine terminated diamides.

In the preparation of the amides from the carbamates, it is preferred to react one mole of the amide with one mole of the carbamate for every hydrogen atom on the amide group to be replaced by the carbamate group. Thus, to form N,N'-di(carballyloxy) 8,12-eicosadiene-1,2-diamide, one should preferably react one mole of the 8,12-eicosadiene-1,12-diamide with approximately two moles of the chloro allylformate.

The temperature at which the reactions may be carried out will vary as required by the nature of the reacting substances. The preferred temperatures range from about room temperature to 200° C. With ammonia or ammonium derivatives the reaction proceeds particularly smooth when temperatures are between 5° C. and 30° C. and are particularly preferred for this reaction. In preparing the monomeric amides of the higher amines or the polymeric amides, the preferred temperatures range from about 100° C. to 200° C. In general, the reactions may be carried out effectively at atmospheric pressures. However, subatmospheric or superatmospheric pressures may be employed if desired or necessary.

As indicated above, when acid chloride is used in the reaction it is preferred to carry out the reaction in the presence of a substance to take up the HCl formed in the reaction. Such substances will generally be employed in a slight excess relative to the acid chloride. If the lower alkyl esters of the acids are employed, conditions should be employed to effect removal of the alkanols formed by the reaction. This is preferably accomplished by maintaining the reaction mixture at a temperature above the boiling point of the formed alkanol.

Although the reactions may generally be carried out without the addition of solvents or diluents, it may be desirable in some cases to carry out the reactions in the presence of such substances. Suitable solvents and diluents include chloroform, dioxane, benzene, toluene, and the like, and mixtures thereof.

Upon completion of the reaction, the amides may be recovered from the reaction mixture by any suitable means, such as filtration, solvent extraction, washing, distillation and the like.

The amides of the present invention vary from viscous liquids to solids. They are soluble in a great variety of solvents, such as benzene, toluene, methyl ethyl ketone and chloroform, and have good compatibility with various resins and oils.

As indicated above, the amides of the invention are particularly useful and valuable in the preparation of resinous materials that are of great value in preparing coating and impregnating compositions. One group of resinous products having these properties may be prepared from the above-described amides which possess a polymerizable ethylenic linkage in the portion of the molecule derived from the ammonia containing material, by polymerizing the amides through that linkage. This polymerization may be accomplished by heating the amides in the presence of a free radical yielding polymerization catalyst, and particularly a free radical yielding peroxide, such as benzoyl peroxide, tertiary butyl hydroperoxide, tertiary butyl perbenzoate, hydrogen peroxide, ditertiary butyl perphthalate, tertiary butyl persuccinate, and the like, and mixtures thereof. The amount of the catalyst added may vary over a considerable range. In general, the amount will vary from 0.1% to 5% by weight of the material being polymerized.

The polymerization may be effected in bulk, in the presence of solvents or diluents, or in an aqueous emulsion or suspension. If solvents are employed, they may be solvents for the monomer and polymer, or they may be a solvent for the monomer and non-solvent for the polymer. Examples of solvents that may be utilized are benzene, toluene, cumene, dioxane and the like.

The temperature employed in the polymerization may vary over a considerable range depending upon the material being polymerized, catalyst selected, etc. In most cases, the temperature will vary from 50° C. to about 250° C. Preferred temperatures range from 65° C. to 150° C. Atmospheric, superatmospheric or subatmospheric pressures may be utilized.

While extremely valuable products are obtained from the polymerization of the unsatuarted N-substituted amides, it is sometimes desirable to copolymerize the said compounds with other polymerizable unsaturated organic compounds, i. e., those containing at least one polymerizable =C=C= group, in order to obtain polymers that may be more desirable for specialized applications. Thus, copolymers which are able to form coatings having outstanding durability may be obtained by copolymerizing the above-described unsaturated amides with unsaturated esters of polybasic acids, preferably those esters derived by esterification of beta,gamma-monoolefinic monohydric alcohols with organic dicarboxylic acids, such as diallyl phthalate, diallyl succinate, diallyl adipate, methallyl adipate, dially oxalate, methallyl maloniate, and the like.

Another class of compounds that can be copolymerized with the above-described N-substituted amides include the unsaturated aliphatic polyethers of saturated polyhydric alcohols, such as the divinyl, diallyl and dimethallyl ethers of glycol, diethylene glycol, trimethylene glycol and similar derivatives of diglycerol, mannitol, sorbitol, and the like. Another class consists of the unsaturated aliphatic organic acid polyesters of polyhydric alcohols, such as the acrylic and methacrylic polyesters of glycerol or glycol. Still another class consists of the conjugated diolefins, such as butadiene, hexadiene, chlorobutadiene, and the like.

Also of special consideration as materials to be copolymerized with the above-described N-substituted amides are the monomers containing a single polymerizable $CH_2=C=$ group, such as the alkenyl substituted aromatic compounds, as styrene, chlorostyrene, alpha-methylstyrene, the vinyl halides, as vinyl chloride and vinyl bromide, the vinylidene halides, such as vinylidene chloride, the ethylenically unsaturated nitriles, such as acrylonitrile, and methacrylonitrile, the unsaturated esters of the aliphatic acid esters wherein the ethylenic linkage is in either the alcohol or acid portion of the molecule, such as allyl acetate, vinyl acetate, methyl acrylate, butyl methacrylate, ethyl acrylate, allyl propionate, and the like.

The above-described copolymers may be produced under substantially the same conditions as described above for the polymerization of the N-substituted amides by themselves.

The proportions of the unsaturated amides and the other polymerizable compounds with which they are to be copolymerized will vary over a wide range depending upon the specific reactants and the type of products desired. In general, resinous products having the valuable properties in the formation of the coatings are obtained when the amount of the amide is at least 15% by weight of the material being polymerized. Resinous products having exceptionally fine properties in the formation of coatings are obtained when the amount of the amide varies from 25% to 95% of the reactants.

As indicated the resinous products prepared by the above-noted polymerization process are particularly valuable in the formation of coating and impregnating compositions. For this application, the polymers are preferably prepared by polymerizing the monomers to the soluble fusible stage and then this polymer is combined with the desired solvents or diluents and other coating materials and the resulting mixture applied to the desired surface and then dried in air or subjected to a baking temperature of the order of about 90° C. to 200° C.

Resinous products of value in the formation of coatings are also obtained by reacting the above-described novel amides having an active hydrogen atom attached to nitrogen with a polyepoxide. Polyepoxides include those materials having a plurality of

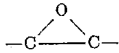

groups, such as vinyl cyclohexene dioxide, butadiene dioxide, epoxidized triglyceride, 1,4-bis-(2,3-epoxypropoxy)-benzene, 1,3-bis(2,3-epoxypropoxy)benzene, 4,4'-bis-(2,3-epoxypropoxy)diphenyl ether, 1,8-bis(2,3-epoxypropoxy)-octane, 1,4-bis(2,3-epoxypropoxy)cyclohexane, 4,4'-bis-(2 - hydroxy - 3,4' - epoxybutoxy) - diphenyldimethylmethane, 1,3-bis(4,5-epoxypentoxy)-5-chlorobenzene, 1,4-bis(3,4-epoxybutoxy) - 2 - chlorocyclohexane, diglycidyl ether, 1,3-bis-(2-hydroxy-3,4-epoxybutoxy)benzene, 1,4-bis(2-hydroxy-4,5-epoxypentoxy)-benzene, and 1,2,3,4-tetra(2-hydroxy-3,4-epoxybutoxy)butane.

Other examples of this type include the glycidyl polyethers of the dihydric phenols obtained by reacting a polyhydric phenol with a great excess of a halogen containing epoxide in the presence of an alkaline medium. Thus, polyether A described hereinafter, which is substantially 2,2-bis(2,3-epoxypropoxyphenyl)propane is obtained by reacting bis-phenol-(2,2-bis(4-hydroxyphenyl)-propane) with an excess of epichlorohydrin as indicated below. Other polyhydric alcohols that can be used for this purpose include resorcinol, catechol, hydroquinone, methyl resorcinol, or polynuclear phenols, such as 2,2-bis(4 - hydroxyphenol)butane, 4,4' - dihydroxybenzophenone, bis(4-hydroxyphenyl)ethane, 2,2-bis(4-hydroxyphenyl)pentane, and 1,5-dihydroxynaphthalene. The halogen-containing epoxides may be further exemplified by 3-chloro-1,2-epoxybutane, 3-bromo-1,3-epoxyhexane, 3-chloro-1,2-epoxyoctane, and the like.

Examples of the polymeric-type polyepoxides include the polyepoxypolyhydroxy polyethers obtained by reacting, preferably in an alkaline medium, a polyhydric alcohol or polyhydric phenol with a polyepoxide, such as the reaction product of glycerol and bis(2,3-epoxypropyl)-ether, the reaction product of sorbitol and bis(2,3-epoxy-2-methylpropyl)-ether, the reaction product of pentaerythritol and 1,2-epoxy-4,5-epoxypentane, and the reaction product of bis-phenol and bis(2,3-epoxy-2-methylpropyl)-ether, the reaction product of resorcinol and bis(2,3,-epoxypropyl)ether, and the reaction product of catechol and bis(2,3-epoxypropyl)ether.

A further group of the polymeric polyepoxides comprises the hydroxy-substituted polyepoxy polyethers obtained by reacting, preferably in an alkaline medium, a slight excess, e. g., .5 to 3 mole excess, of a halogen-containing epoxide as described above, with any of the aforedescribed polyhydric phenols, such as resorcinol, catechol, bis-phenol, bis(2,2'-dihydroxy-dinaphthyl)methane, and the like.

Also included within this group are the polyepoxy polyethers obtained by reacting, preferably in the presence of an acid-acting compound, such as hydrofluoric acid, one of the aforedescribed halogen-containing epoxides with a polyhydric alcohol, such as glycerol, propylene glycol, ethylene glycol, trimethylene glycol, butylene glycol, and the like.

Other polymeric polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light, and the like, they undergo addition polymerization at the multiple bond leaving the epoxy group unaffected. These monomers may be polymerized with themselves or with other ethylenically unsaturated monomer, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chlorallyl acetate, and vinyl methallyl pimelate. Illustrative examples of these polymers include poly(allyl 2,3-epoxy-propyl ether), poly(2,3-epoxypropyl crotonate), allyl 2,3-epoxypropyl ether-styrene copolymer, methallyl 3,4-epoxybutyl ether-allyl benzoate copolymer, poly(vinyl 2,3-epoxypropyl ether), allyl glycidyl ether-vinyl acetate copolymer and poly(4-glycidyloxystyrene).

Another group of polyepoxides include the epoxy esters of polybasic acids, such as diglycidyl phthalate and diglycidyl adipate, diglycidyl tetrahydrophthalate, diglycidyl maleate, and the like.

Particularly preferred polyepoxides are the monomeric and polymeric-type glycidyl polyethers of dihydric phenols obtained by reacting epichlorohydrin with a dihydric phenol in an alkaline medium. The monomer products of this type may be represented by the general formula

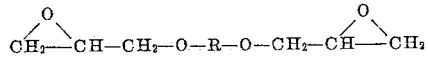

wherein R represents a divalent hydrocarbon radical of the dihydric phenol. The polymeric products will generally not be a single simple molecule but will be a complex mixture of glycidyl polyethers of the general formula

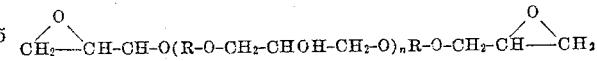

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyether will be illustrated below. Unless otherwise specified, parts indicated are parts by weight.

PREPARATION OF GLYCIDYL POLYETHERS OF DIHYDRIC PHENOLS

*Polyether A*

About 2 moles of bis-phenol was dissolved in 10 moles of epichlorohydrin and 1% to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50 so the epoxy equivalency was 1.75. For convenience, this product will be referred to hereinafter as polyether A.

*Polyether B*

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durrans' mercury method and a molecular weight of 483. The product had an epoxy value eq./100 g. of 0.40 so the epoxy equivalence was 1.9. For convenience, this product will be referred to as polyether B.

*Polyether C*

About 228 parts of bis-phenol and 84 parts sodium hydroxide as a 10% aqueous solution were combined and heated to about 45° C. whereupon 176 parts of epichlorohydrin was added rapidly. The temperature increased and remained at about 95° C. for 80 minutes. The mixture separated into a two-phase system and the aqueous layer is drawn off. The resinous layer that remained is washed with hot water and then drained and dried at a temperature of 130° C. The Durrans' mercury method melting point of the resulting product is 52° C. and the molecular weight is about 710. The product has an epoxy value of 0.27 eq./100 g. so the epoxy equivalency is 1.9.

*Polyether D*

By using a smaller ratio of epichlorohydrin to bis-phenol, a glycidyl polyether of higher melting point was obtained. Thus, polyether D was obtained in the same manner as polyether C except that for every mol of bis-phenol, there was used 1.57 mols of epichlorohydrin and 1.88 mols of sodium hydroxide. This provided a product having a melting point of about 70° C., a molecular weight of 900, and an epoxide value of 0.20 eq./100 g.

The resinous products described above are obtained by merely mixing the amide with the polyepoxide in the desired proportions. If the amide is an unsubstituted amide free of basic nitrogen, one should employ an alkaline catalyst to assist in the reaction. Sodium hydroxide and alkaline metal alkoxides are particularly preferred for this purpose.

The amount of the amide and the polyepoxide employed will vary depending upon the type of product desired. Preferably, the amide and polyepoxide are employed in approximately equal molecular amounts, but very satisfactory products have been obtained when they are combined in mole ratios varying from about 2:1 to 1:2.

As indicated, the above resinous products obtained from the novel amides are particularly useful in the preparation of coating compositions. In this application, the amide and polyepoxide, and catalyst if needed, are combined with a suitable coating solvent or diluent and then this mixture is applied to the surface, such as metal, wood, glass, cloth, plaster and the like, and then air-dried or preferably cured at temperatures ranging from 90° C. to about 200° C.

The resinous products produced above from the unsaturated amides as well as the amides containing the active hydrogen are also valuable in the preparation of castings and moldings. In this case, the reactants or prepolymer thereof are placed in the desired mold and heated to a curing temperature. The resinous products are particularly useful in this application in the preparation of pottings for electrical apparatus.

The novel amides themselves are also of value as plasticizer and flexibilizing agents for thermoplastic polymers, such as the halogen-containing polymers as poly(vinyl chloride) and cellulose derivatives, as nitrocellulose. In this case, the materials act both as a plasticizing and flexibilizing agent as well as a pesticidal agent.

The novel amides may also be used directly as additives for herbicidal, fungicidal and/or insecticidal compositions. In this application, they may be dissolved alone or in combination with toxicants as pyrethren- or rotenone-containing extracts in suitable non-corrosive organic solvents, emulsified with water and wetting and dispersing agents or dispersed in and on finely-divided solid carriers, such as diatomaceous earth, bentonite, talc, wood flour, etc.

To illustrate the manner in which the invention may be carried out, the following examples are given. It is to be understood that the examples are for the purpose of illustration and the invention is not to be regarded as limited to any of the specific compounds or compositions therein. Unless otherwise specified, parts disclosed in the examples are parts by weight.

EXAMPLE I

This example illustrates the preparation and properties of N,N'-di(5-amino-2-azapentyl) 8,12-eicosadiene-1,20-diamide from dimethyl 8,12-eicosadienedioate and diethylene triamine.

0.53 mole of diethylene triamine and 0.27 mole of dimethyl 8,12-eicosadiene-1,20-dioate were placed in a reaction flask equipped with a condenser and the mixture heated at 150° C. The methanol formed in the reaction was taken off substantially as fast as it was formed in the mixture. After the theoretical amount of methanol was recovered, the product was stabilized at 150° C. (3–4 mm.). The product consisting substantially of N,N'-di(5-amino-3-azapentyl) 8,12-eicosadiene-1,20-diamide was an amber semi-solid containing 13.81% nitrogen.

Several coating compositions were prepared by combining 15-part, 20-part, 30-part and 40-part portions of the N,N'-di(5-amino-5-azapentyl) 8,12-eicosadiene-1,20-diamide with 100-part portions of polyether D having a molecular weight of 900 and an epoxy value of 0.20 eq./100 g. These mixtures were then combined with a solvent containing xylene, butyl alcohol and methyl Cellosolve so as to form compositions having 60% solids. The resulting solutions were then applied to tin panels and the films cured at room temperature. Each of the coatings formed very hard, clear flexible films having good resistance to boiling water, toluene and methyl-isobutyl ketone.

Other coating compositions were prepared by combining 30, 40 and 50-part portions of the N,N'-di(5-amino-5-azapentyl) 8,12-eicosadiene-1,20-diamide with 100-part portions of polyether A. These mixtures were also combined with a solvent containing xylene, butyl alcohol and methyl Cellosolve so as to form compositions having 60% solids. The resulting solutions were then applied to tin panels and cured at 125° C. Each of the coatings formed very hard, clear flexible films having good resistance to boiling water, toluene and methylisobutyl ketone.

EXAMPLE II

This example illustrates the preparation and properties of N,N'-di(3-aminophenyl) 8,12-eicosadiene-1,20-diamide from dimethyl 8,12-eicosadiene-1,20-dioate and m-phenylenediamine.

4.6 moles of m-phenylenediamine and 0.27 mole of dimethyl 8,12-eicosadiene-1,20-dioate were placed in a reaction flask equipped with a condenser and the mixture heated at 150° C. The methanol formed in the reaction was taken off substantially as fast as it was formed in the mixture. The product was stabilized at 190° C. (2–3 mm.). The product consisting substantially of N,N'-di(3-aminophenyl) 8,12-eicosadiene-1,20-diamine was a brittle black solid having a nitrogen content of 8.64%.

Several castings were prepared by combining 40, 50 and 60-part portions of the N,N'-di(3-aminophenyl) 8,12-eicosadiene-1,20-diamide with 100-part portions of polyether A and the mixtures heated at 120° C. for four hours. The resulting castings were quite hard and flexible.

A coating composition is prepared by combining 60 parts of the N,N'-di(3-aminophenyl) 8,12-eicosadiene-1,20-diamide produced above with 100 parts of polyether A and adding this mixture to a solvent containing xylene, butyl alcohol and methyl Cellosolve so as to form a composition having 60% solids. This composition is then applied to tin panels and films cured at 120° C. The resulting coatings are hard, clear and have good flexibility.

Diamides having related properties are obtained by replacing the dimethyl 8,12-eicosadiene-1,20-dioate with equivalent amounts of each of the following: diethyl 8,12-diethyl-8,12-eicosadiene-1,20-dioate, dimethyl 3,3,4,4-tetramethyl-8,12-eicosadiene-1,20-dioate and dimethyl 7-vinyl-9-hexadecene-1,16-dioate.

EXAMPLE III

This example illustrates the preparation and properties of N,N'-di(2-aminoethyl) 8,12-eicosadiene-1,20-diamide from dimethyl 8,12-eicosadiene-1,20-dioate and ethylene diamine.

5.20 moles of ethylene diamine and 0.27 mole of the dimethyl 8,12-eicosadiene-1,20-dioate were placed in a reaction flask equipped with a condenser and the mixture heated at 130° C. The methanol formed in the reaction was taken off substantially as fast as it was formed in the mixture. The mixture was stabilized at 140° C. (2-3 mm.). The product consisting substantially of N,N'-di(2-aminoethyl) 8,12-eicosadiene-1,20-diamide was a very viscous, almost solid, material having a nitrogen content of 11.81%.

Several castings were prepared by combining 100-part portions of polyether A described above with 25, 30, 40 and 50-part portions of the N,N'-di(2-aminoethyl) 8,12-eicosadiene-1,20-diamide and the mixtures heated at 150° C. for several hours. The resulting castings are hard and flexible.

A coating composition is prepared by combining 100 parts of the N,N'-di(2-aminoethyl) 8,12-eicosadiene-1,20-diamide with 60 parts of polyether A and adding this mixture to a solvent containing xylene, butyl alcohol and methyl Cellosolve so as to form a composition having 60% solids. This composition is then applied to tin panels and the films cured at 140° C. The resulting coatings are hard, clear and flexible.

EXAMPLE IV

This example illustrates the preparation and properties of 8,12-eicosadienediamide-1,20.

A mixture of crystalline eicosadiene-1,20-dioic acids as shown above (17 parts) was combined with 30 parts of oxalyl chloride and 50 parts of benzene and the mixture allowed to stand at room temperature for half an hour and then warmed under reflux for two hours on the steam bath. The mixture was concentrated under vacuo on the steam bath and the warm residue was added dropwise with stirring to 150 ml. of cold concentrated ammonium hydroxide (29%). After stirring at room temperature for an hour, the white solid was collected by filtration, digested with hot water, refiltered and washed well with water. After drying to constant weight there was obtained 17 parts of the 8,12-eicosadienediamide-1,20; M. P. 171–175° C. Recrystallization from ethanol gave 13 parts M. P. 172–174° C. Analysis was as follows:

|  | Found | Theory |
| --- | --- | --- |
| Carbon | 71.2 | 71.4 |
| Hydrogen | 10.7 | 10.8 |
| Nitrogen | 8.1 | 8.3 |

Several castings are prepared by combining 100-part portions of polyether A described above with 25, 40, and 60-part portions of the 8,12-eicosadienediamide-1,20 and 6 parts of diethylene triamine and the mixtures heated at 150° C. for several hours. The resulting castings are hard and flexible.

A coating composition is prepared by combining 100 parts of the 8,12-eicosadienediamide-1,20 with 60 parts of polyether A and 4 parts of diethylene triamine and the mixture added to a solvent containing xylene, butyl alcohol and methyl Cellosolve so as to form a composition having 60% solids. This composition is then applied to tin panels and the films cured at 140° C. The resulting coatings are hard, clear and flexible.

EXAMPLE V

This example illustrates the preparation and some of the properties of N,N'-diallyl 8,12-eicosadiene-1,20-diamide from the acid chloride of 8,12-eicosadiene-1,20-dioic acid and allylamine.

0.27 mole of the acid chloride of 8,12-eicosadiene-1,20-dioic acid and 0.54 mole of allylamine, and 0.57 mole of pyridine are combined with benzene and the mixture allowed to stand at room temperature for half an hour and then warmed on the steam bath overnight. The reactants were then washed with water, dilute hydrochloric acid and then again with water. On removing the benzene, the amide N,N'-diallyl 8,12-eicosadiene-1,20-diamide separates as a solid.

About 100 parts of the N,N'-diallyl 8,12-eicosadiene-1,20-diamide is combined with 75 parts of diallyl phthalate and 3 parts of benzoyl peroxide in 100 parts of benzene and the mixture heated at 65° C. until the mixture becomes quite thick. Additional benzene is then added and the mixture spread on tin panels and baked at 150° C. The resulting films are hard, clear and durable.

Amides having related properties are obtained by replacing the allylamine in the above-described preparation process with equivalent amounts of each of the following: methallylamine, ethallylamine, chloroallylamine and 2-butenylamine.

EXAMPLE VI

This example illustrates the preparation of N,N'-di(carballyloxy) 8,12-eicosadiene-1,20-diamide from 8,12-eicosadiene-1,20-diamide produced in one of the preceding examples and allyl chloroformate.

0.27 mole of 8,12-eicosadiene-1,20-diamide and 0.54 mole of allyl chloroformate 0.54 mole of pyridine are combined in chloroform and the mixture held at a temperature of 10° C. for seceral hours. The mixture is then heated on the steam bath overnight. The mixture is then washed as shown in the preceding example. The resulting product is identified as N,N'-di(carballyloxy) 8,12-eicosadiene-1,20-diamide.

A casting is prepared from the above product by combining 100 parts of the diamide with 50 parts of ethylene glycol diacrylate and 4 parts of benzoyl peroxide and heating the mixture at 65° C. for several hours. The resulting casting is hard and flexible.

A coating composition is prepared by combining 100 parts of the diamide with 60 parts of polyether B and 4 parts of diethylene triamine and the mixture added to a solvent containing xylene, butyl alcohol and methyl Cellosolve so as to form a composition having 60% solids. This composition is then applied to tin panels and the films cured at 140° C. The resulting coatings are hard and durable.

Amides having related properties are obtained by replacing the allyl chloroformate in the above process with equivalent amounts of each of the following: methallyl chlorothionformate, 2-butenyl chlorodithionformate and ethallyl chloroformate.

We claim as our invention:
1. An amide selected from the class of amides having the formula

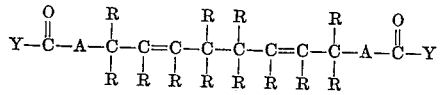

and those having the formula

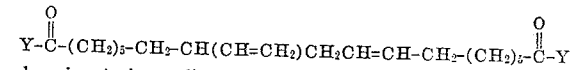

wherein A is a divalent saturated hydrocarbon radical containing a chain of from 3 to 5 carbon atoms between two valence bonds and having a total of no more than 12 carbon atoms, R is a member of the group consisting of hydrogen, lower alkyl radicals and chlorine with no more than 5 R's being chlorine, and Y is a member of the group consisting of

and

wherein $R_1$ is a hydrocarbon radical containing no more than 18 carbon atoms, $R_2$ and $R_3$ are bivalent hydrocarbon radicals containing no more than 10 carbon atoms and $R_4$ is a hydrocarbon containing no more than 12 carbon atoms and $n$ is an integer from 1 to 8.

2. An amide of the structure

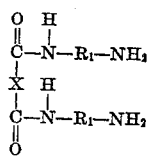

wherein X is a residue of 8,12-eicosadienedioic acid, obtained by removing the two carboxyl groups, and $R_1$ is a bivalent hydrocarbon radical containing up to 10 carbon atoms.

3. An amide of the structure

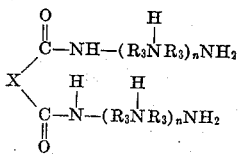

wherein X is a residue of 8,12-eicosadienedioic acid, obtained by removing the two carboxyl groups, and $R_3$ is a bivalent hydrocarbon radical containing up to 10 carbon atoms and $n$ is an integer from 1 to 8.

4. A N,N'-dialkenyl amide of 8,12-eicosadienedioic acid wherein the alkenyl radicals attached to the nitrogen atoms contain up to 8 carbon atoms.

5. A N,N'-di(aminoalkyl) amide of 8,12-eicosadienedioic acid wherein the aminoalkyl groups attached to the nitrogen atoms contain from 1 to 18 carbon atoms.

6. A N,N' - di(amino - polyazaalkyl)amide of 8,12-eicosadienedioic acid wherein the aminopolyazaalkyl groups attached to the amido nitrogen atoms contain from 2 to 8 aza nitrogen atoms, and the bivalent hydrocarbon groups joining the aza nitrogen atoms contain no more than 10 carbon atoms.

7. 8,12-eicosadiene-1,20-diamide.

8. N,N'-di(5 - amino - 3 - azapentyl) 8,12-eicosadiene-1,20-diamide.

9. N,N' - di(3 - aminophenyl) 8,12-eicosadiene-1,20-diamide.

10. N,N'-diallyl 8,12-eicosadiene-1,20-diamide.

11. N,N'-dicarballyloxy 8,12-eicosadiene-1,20-diamide.

References Cited in the file of this patent
UNITED STATES PATENTS

| | | |
|---|---|---|
| 2,371,104 | Kienle et al. | Mar. 6, 1945 |
| 2,609,380 | Goldstein et al. | Sept. 2, 1952 |
| 2,609,381 | Goldstein et al. | Sept. 2, 1952 |
| 2,659,713 | Magat | Nov. 17, 1953 |
| 2,675,369 | Scrutchfield | Apr. 13, 1954 |
| 2,680,713 | Lindsey et al. | June 8, 1954 |
| 2,757,192 | Jenner | July 31, 1956 |

FOREIGN PATENTS

| | | |
|---|---|---|
| 605,848 | Great Britain | July 30, 1948 |